United States Patent [19]

Ito et al.

[11] 4,384,787
[45] May 24, 1983

[54] METHOD AND APPARATUS FOR ADJUSTING THE QUANTITY OF LIQUID DEPOSITED ON FINE GRANULAR MATERIALS AND METHOD OF PREPARING MORTAR OR CONCRETE

[75] Inventors: Yasuro Ito, 38-16, 4-chome, Nakano-ku, Tokyo, Japan; Yoshiro Higuchi, Tokyo, Japan

[73] Assignees: Yasuro Ito; Taisei Corporation, both of Tokyo, Japan

[21] Appl. No.: 134,210

[22] Filed: Mar. 26, 1980

[30] Foreign Application Priority Data

Jun. 28, 1979 [JP] Japan .................................. 54-80807
Oct. 1, 1979 [JP] Japan .................................. 54-126587
Nov. 16, 1979 [JP] Japan .................................. 54-138645
Nov. 16, 1979 [JP] Japan .................................. 54-147628

[51] Int. Cl.³ ............................................. B28C 7/00
[52] U.S. Cl. .................................... 366/6; 366/40; 366/65; 366/155; 210/787; 210/801

[58] Field of Search .................. 366/2, 3, 5, 6, 8, 10, 366/13, 40, 34, 36, 65, 1, 154, 155, 159, 165, 348, 349; 210/787, 801, 512.1, 521.3; 209/190; 233/3, 7; 51/431–433, 410

[56] References Cited

U.S. PATENT DOCUMENTS 2,815,716 12/1957 Ransohoff ............................ 51/410
3,769,753 11/1973 Fleischer ............................. 51/428
3,865,725 2/1975 Condolios .......................... 210/787
3,941,684 3/1976 Grover ................................ 209/3
4,190,369 2/1980 Rikker ................................ 366/34
4,239,396 12/1980 Arribau ............................... 366/2

Primary Examiner—Robert W. Jenkins
Attorney, Agent, or Firm—Birch, Stewart, Kolasch and Birch

[57] ABSTRACT

The quantity of water on the surface of sand particles is reduced by applying an impact force, e.g. centrifugal force created by a rotating disc. The sand particles thus treated are especially suitable for preparing a green concrete compound or a cement mortar by mixing them with water, gravel and cement.

8 Claims, 34 Drawing Figures

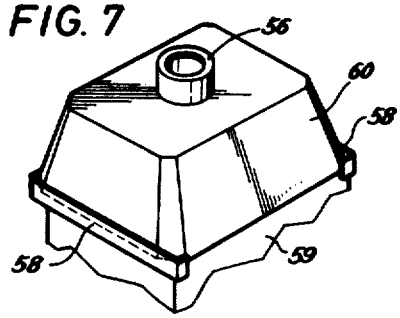
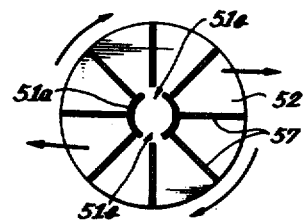
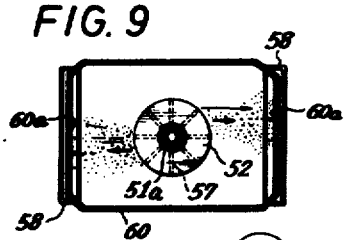
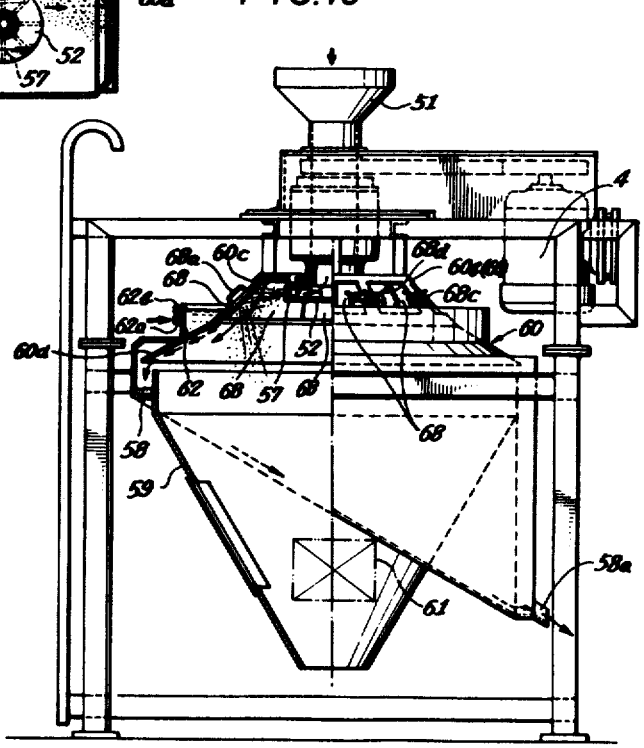

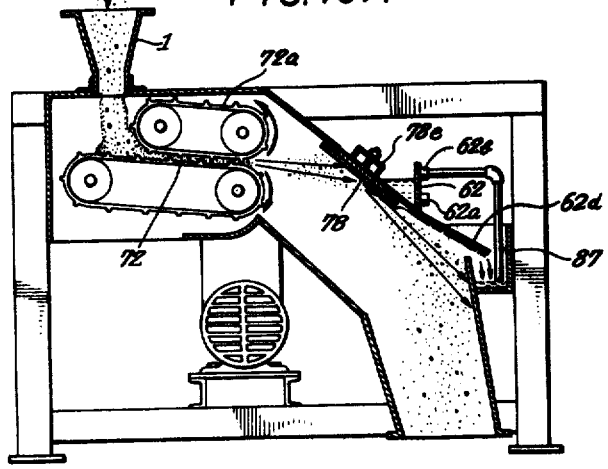
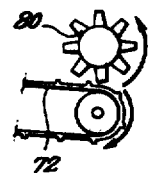
FIG. 18A  FIG. 18B
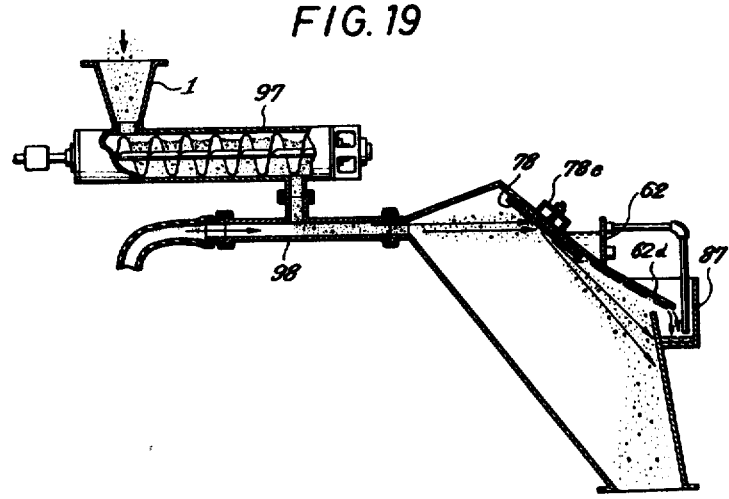
FIG. 19

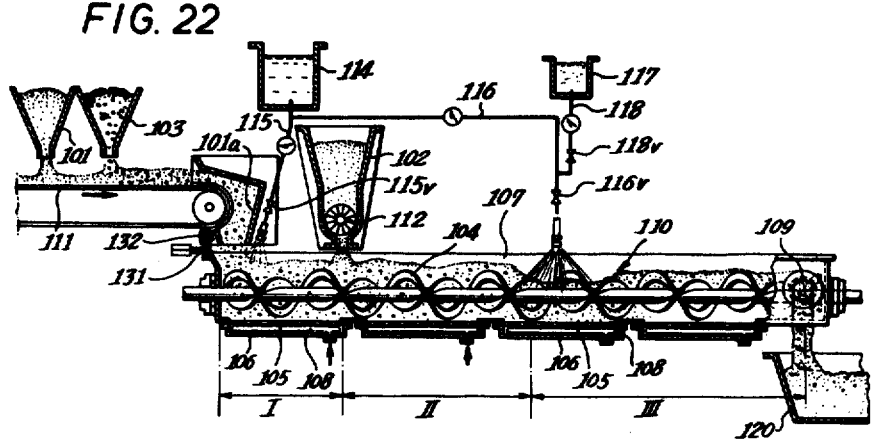
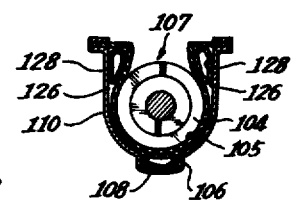
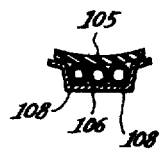
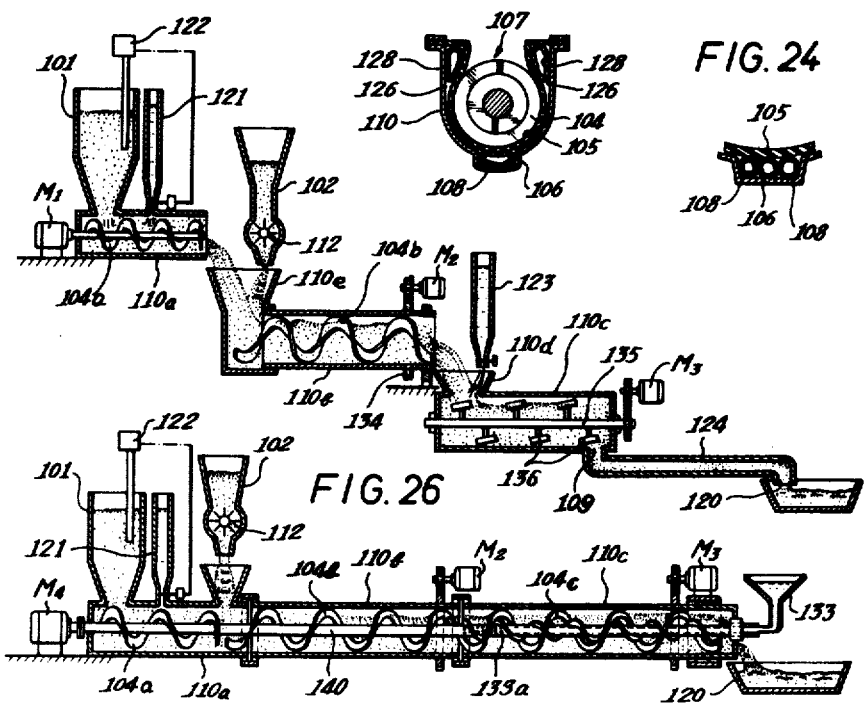

METHOD AND APPARATUS FOR ADJUSTING THE QUANTITY OF LIQUID DEPOSITED ON FINE GRANULAR MATERIALS AND METHOD OF PREPARING MORTAR OR CONCRETE

BACKGROUND OF THE INVENTION

This invention relates to a method and apparatus for adjusting the quantity of liquid, typically water, deposited on the surfaces of fine granular materials, and a method of preparing mortar or concrete by utilizing the treated granular material.

Fine aggregates comprising river or mountain sand or artificial fine particles are widely used to prepare cement mortar or lime stone type hydraulic mortar which is used to construct buildings or many other civil structures. When digging or crushing various ores utilized in metallurgy or ceramic industry and coal, fine particles or dust are formed. Further, depending upon the field of use, it is necessary to crush the ores or coal into granules having a predetermined size. When pulverizing or refining these substances or when using them for chemical reactions, fine granules in the form of sludge or the like are often formed. As is well known, these fine granules contain substantial quantity of water adhering to the surface thereof. This is true not only for river or mountain sand but also coal. Especially, in recent years, these substances are dug by using jet water so that the quantity of the deposited water is considerably large. Even with converter slag which is free from water when it is formed, water is used to collect it. Moreover, as these materials are stored in the outdoor they are wetted by rain, dew or snow. Such wet particles can not be used directly. For example, when sintering or converting these materials to coke, and even when they are directly charged to a furnace, it is necessary to preliminally dry them before actual use. This requires extra heat energy, i.e., fuel. As will be described later in more detail, when a fine aggregate composed of river or mountain sand is used for the preparation of mortar or cement, the quantity of the deposited or surface water is an important factor which influences the quality of the product. Although the composition and particle size of the sand also influences the quality of the product, so long as sand collected from the same source is used it is easy to utilize the sand having the same composition and particle size and it is rare to admix sands from different sources. When the sand contains particles of different size it is easy to classify them into fine, medium and coarse particles with a sieve and a small difference in the particle size does not result in a great difference in the quality of the product. However, the quantity of the surface water varies greatly depending upon the source, the methods of collecting, conveying and storing the sand. Moreover, the specific surface area of the fine particles of sand is large so that the relative quantity of the deposited water is large. Moreover, sand contains water in the interstices of the sand particles which varies from time to time depending upon weather conditions. More particulary, when sand from the same source is piled up on the ground, its water content varies at the top and the bottom, and in the morning and at noon. When preparing cement mortar or concrete by using a fine aggregate, the ratio of water to cement (W/C), the ratio of cement to fine aggregate (C/g) and the ratio of cement or sand to a coarse aggregate (S/G or C/G) have a great influence upon the strength of the resulting product, fluidity, moldability and workability. Thus, when an excessive quantity of water is incorporated, segregation and bleeding are inevitable, thus decreasing the mechanical strength of the product. On the other hand deficient water impairs moldability and pouring property, so that even when vibration or pressure is applied at the time of molding or pouring it is difficult to obtain a dense structure which also decreases the mechanical strength. As above described, notwithstanding the fact that it is essential to select adequate W/C, etc., as the quantity of the deposited water varies greatly and as it is difficult to simply and accurately measure the quantity of the surface water, it is difficult to realize ideal ratios W/C and S/C, etc. Although it has been proposed to completely dry the fine aggregate or to measure the weight thereof in water, such methods are not suitable at the field where a large quantity of sand is used. More particularly, the former method requires a large quantity of heat energy and time and the latter method requires a step of perfectly permeating water into sand to drive off air according to JIS (Japanese Industrial Standard) it is prescribed to immerse the sand in water for 24 hours and a step of draining the water contained in the sand.

SUMMARY OF THE INVENTION

It is therefore an object of this invention to provide an improved method and apparatus for quickly and accurately adjusting the quantity of water deposited on fine granular aggregate.

Another object of this invention is to prepare cement mortar or concrete of improved quality by utilizing the fine aggregate, with its quantity of surface water adjusted, to a desired value.

According to one aspect of this invention there is provided a method of adjusting a quantity of liquid deposited on fine particles, i.e. sand, comprising the steps of successively supplying a predetermined quantity of the fine particle deposited with liquid, and then applying an impact force larger than the adhesive force of the liquid to the fine particles thereby removing the deposited liquid.

According to another aspect of this invention there is provided an apparatus for separating liquid from fine particles comprising liquid separating means for applying a impact force to the fine particles so as to remove excess liquid deposited on the particles and means for successively supplying the fine particles to the liquid separating means.

The impact force can be imparted by centrifugal force created by a rotating disc, a conveyor running at a high speed or pressurized gas.

The invention is especially suitable to adjust the quantity of water on sand particles which are used to prepare cement mortar or a green concrete compound. The quantity of water remaining on the surface of the sand particles is used to determine the quantity of water to be subsequently added to a mixture of sand, gravel and cement.

BRIEF DESCRIPTION OF THE DRAWINGS

In the accompanying drawings:

FIG. 7 is a perspective view showing an impact frame shown in FIG. 6;

FIG. 8 is a plan view of the rotating disc shown in FIG. 6 taken along a line VIII—VIII;

FIG. 9 is a sectional plan view taken along a line IX—IX in FIG. 6;

FIG. 10 is a side view, partly in longitudinal section, of another embodiment of the water separator;

FIGS. 17, 18A, 18B, 19 and 20 show still another modifications of the water separator;

FIG. 22 is a longitudinal sectional view showing one example of a mixer;

FIG. 23 is a cross-sectional view of the mixing chamber shown in FIG. 22;

FIG. 24 is a cross-sectional view showing a modified pressure applying chamber;

FIGS. 25 and 26 are longitudinal sectional views showing modified mixers;

DESCRIPTION OF THE PREFERRED EMBODIMENTS

Figure 1:
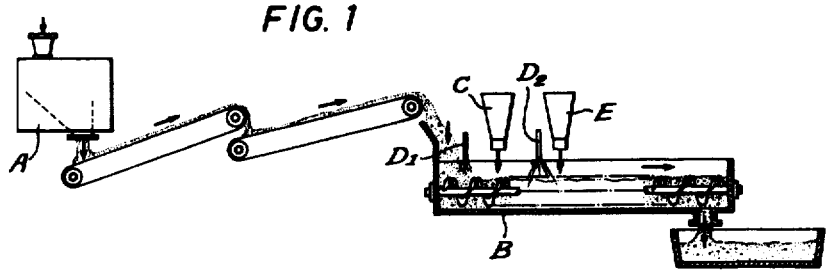
FIG. 1 is a general side view showing one example of the apparatus utilized to carry out the method of the invention.

Before describing the invention in detail with reference to the accompanying drawings, the principle and advantages of the present invention will first be described.

Where excessive surface water is removed by heat or wind power, it is not only diffficult to accurately adjust the quantity of water deposited on the fine aggregate but also, a large quantity of heat energy and time are required. As above described according to this invention, the quantity of water is adjusted by applying an impact force or velocity energy to the fine aggregate. However, with this improved method, the quantity of water that can be efficiently removed varies depending upon the quantity of water originally contained. For this reason the impulse or impact force applied to the sand must be determined depending upon the quantity of water originally contained. The impact force or shock can be applied by beating but is is more advantageous to apply it as velocity energy. Where the quantity of the deposited water is relatively large, use of the velocity energy caused by gravity is effective to remove a certain amount of water. More advantageous velocity energy is that utilizing wind power, rotating force, or centrifugal force. One or combinations of two or more of these velocity energies can be used. It is also possible to sprinkle the particles by applying thereto the velocity energy of rotating force or centrifugal force to cause the sprinkled particles to collide against a surface to remove the surface water. Alternatively, while the particles are at a standstill or slowly dropping under gravity, an impact force may be applied to cause the particles to collide against a rotating body. In each case, the surface water is transferred to the surface or body colliding with the particles to adjust the quantity of water remaining on the surface thereof. Thus, the quantity of remaining water is inversely proportional to the strength of the impact force whereby the quantity of the remaining water can be adjusted to a desired value by suitably selecting the strength of the impact force. In other words, irrespective of the particle size (fine, medium or coarse) of a fine aggregate which usually contain a relatively small amount of water, for example 2 to 4%, the water can be removed adequately by using a suitable impact force. More advantageously, when the quantity of the deposited water is large, for example 7-8% or more, water beyond a certain limit can be removed by the impact energy, the degree of removal being proportional to the impact energy. With a fine aggregate whose quantity of deposited water varies in a relatively small range, for example from 2.5-6%, it is advantageous to determine the quantities of water and cement to be incorporated subsequently. When the quantity of the water deposited on the particles of the fine aggregate is reduced or adjusted to a predetermined value, it is possible to readily obtain desired ratios of W/C, C/S and G/S, thus ensuring uniform quality of the resulting product.

From the standpoint of cost of installation and operating power, it is advantageous to cause the particles of the fine aggregate to collide against a stationary surface by using a rotating disc in which case the particles are supplied to the central portion of the disc to cause them to fly by centrifugal force. The sand often contains mud or clay which deposit on the surface of the sand particles, and in an extreme case the layer of the deposited mud or clay bonds together the particles of the fine aggregate colliding thereupon to increase the thickness of the layer. Further, the deposited layer may act as a cushion layer to decrease the impact force applied to the particles thereby varying the quantity of the deposited water even with the same impact force. In such a case it is necessary to clean the stationary surface with water or with a rotating wiper or by rotating the surface.

In cold season, water containing sand freezes in which case the sand is defrozen with steam to separate its particles. When sea sand is used salt contained therein can be removed when the quantity of the deposited water is reduced by the method of this invention.

FIG. 1 is a side view of one example utilized to carry out the method of this invention which comprises an impact water separator A into which a fine aggregate is continuously supplied by a conveyor or the like and a mixer B. It is advantageous that the mixer B is of a continuous type and provided with mechanisms C, D and E respectively for incorporating a powder of hydraulic substance, water and such additives as a dispersing agent.

Figure 2:
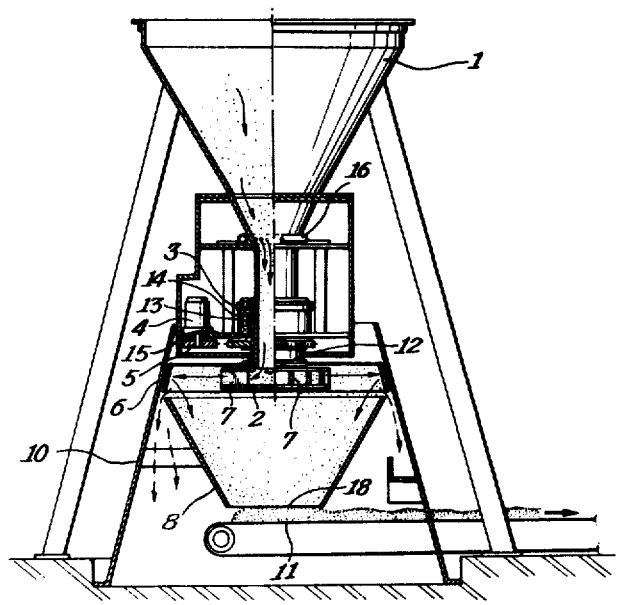
FIG. 2 is a longitudinal sectional view of the water separator A shown in FIG. 1.

Although any type of impact water separator A can be used in this invention, a preferred separator shown in FIG. 2 comprises a hopper 1, and a rotating disc 2 disposed beneath the hopper 1. The rotary disc 2 is provided with a central opening 12 to receive the fine aggregate from the hopper and a plurality of radial vanes 7. The rotary disc 2 is supported by a rotatable sleeve 13 supported by a stationary sleeve 14 through bearings 3. The sleeve 13 is rotated by an electric motor 4 through pulleys 5 and 15 and a belt passing about these pulleys. An annular ring 6 is disposed to surround the rotary disc 2 with a suitable distance therebetween, the annular ring being detachably mounted on the inner side of a lower front conical hollow casing 10. Funnel shaped receiver 8 is contained in the lower portion of the lower casing 10 with a suitable gap therebetween. Adjacent the discharge opening 18 at the lower end of the receiver 8 is disposed a conveyor 11 for receiving the fine aggregate which falls down after collision against the annular ring 6. The annular ring 6 is slightly inclined, and if desired its upper edge may be bent inwardly for preventing upward sprinkling of the sand particle. By increasing the inclination angle of the annular ring the collection of the sand particles by the receiver 8 can be improved. A water spray pipe 16 is provided at the lower end of the hopper 1 and if desired a screw type or ribbon type agitator may be provided at the lower end of the hopper to uniformly apply a suitable quantity of water to the sand particles. The water separated by the collision against the annular ring falls down as shown by dotted line arrows to the bottom of the lower casing 10.

Figure 3:
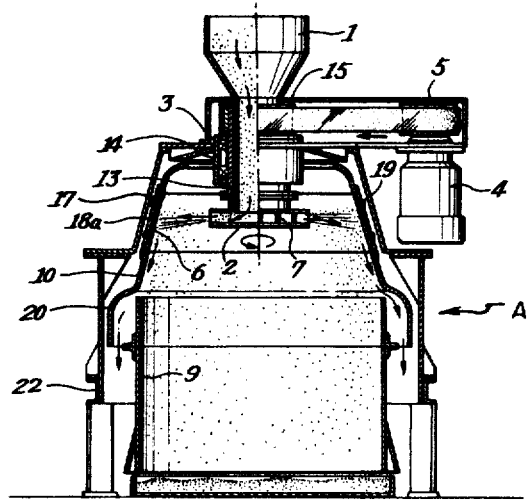
FIG. 3 is a longitudinal sectional view showing a modified water separator.

FIG. 3 shows a modified water separator A utilized in this invention in which the relative arrangement of the hopper 1, rotating disc 2, the sleeve 13, and the motor 4 is generally similar to that of the first embodiment. However, the annular ring or impact plate 6 against which the sand particle are ejected by the centrifugal force created by the rotating disc 2 is interposed between separated upper portions of a bell shaped receiver 10 and reinforced by an outer ring 18a secured to the annular ring by screws 19. This construction allows ready exchange of the annular ring 6. The lower end 20 is bulged outwardly to receive the upper end of a receptacle 9 supported by a frame 22. A small gap is defined between the upper end of the receptacle 9 and the bulged out end 20 to permit passage of the separated water, whereas dehydrated sand particles fall down into the receptacle.

Although not shown in FIG. 3, it should be understood that a conveyor is installed beneath the receptacle in the same manner as in FIG. 2 to convey the sand particles to the mixer B shown in FIG. 1.

Figure 4:
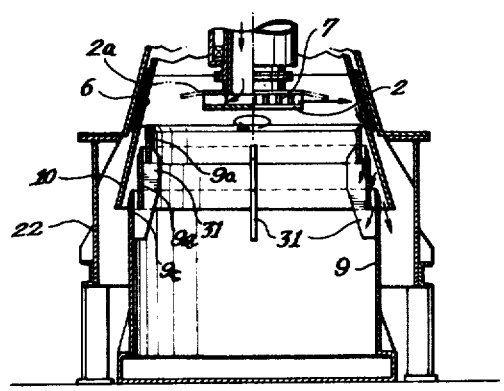
FIG. 4 is a partial longitudinal sectional view showing a modification of the water separator shown in FIG. 3.
Figure 5:
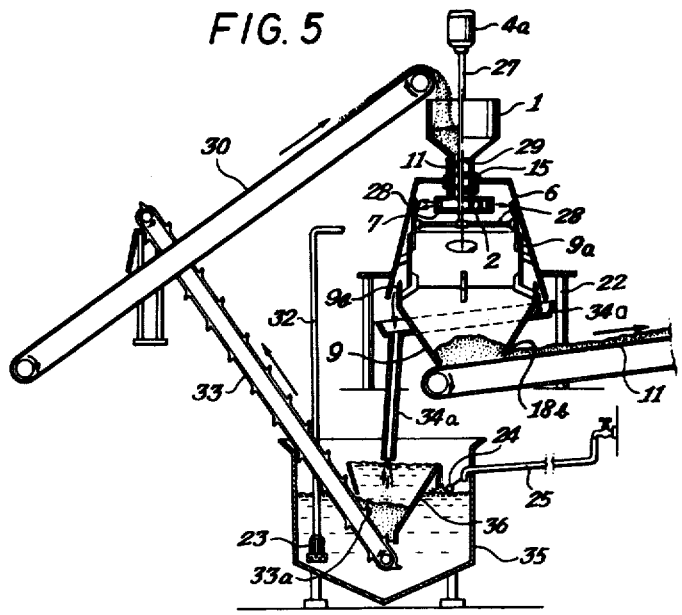
FIG. 5 is a side view of the water separator with auxiliary equipment.

The casing 10 of the water separator shown in FIG. 3 may be modified as shown in FIG. 4 and various auxiliary equipments may be provided as shown in FIG. 5. Thus, as shown in FIG. 4, a plurality of telescoped annular members 9a and 9b connected by connecting members 31 to the upper edge 9c of the receptacle 9 are disposed within the annular ring 6. The upper ends of respective annular members 9a, 9b and 9c are shaped to define a passage together with the inner surface of the casing 10 for passing air and water. These knife edge shaped upper ends further function to deflect the sand particles moving along the inner surface of the casing 10 away therefrom toward the inside of the receptacle 9.

An annular rotating disc 2a slightly inclined downward as shown by dotted lines may be attached to the rotating disc 2 for directing the sand particles to the lower side. With this construction the projected sand particles are blasted against the lower portion of the annular ring 6 by a centrifugal force sufficient to separate the sand particles and water by the inclined auxiliary rotating disc 2a so that the vanes 7 may be omitted. In this case, the spacings between the annular members 9a, 9b and 9c and the casing 10 may be made smaller than those shown in FIG. 4.

When the water separator shown in FIG. 4 is operated under optimum operating conditions to be described later, the substance that flows downwardly along the inner surface of the casing consists essentially of water and mud which can be discarded.

However, optimum operating conditions are not always obtained depending upon the characteristic of the sand particles. In such a case, the substance falling to the outside of the receptacle 9 through a gap between the lower inner surface of the casing 10 and the knife edge shaped portion 9c is separated into water, mud and sand particles which can be recharged into the hopper 1 by a conveyor or the like. The water component separated by the water separator may be used to prepare concrete mortar in the subsequent step.

FIG. 5 shows one example of a practical installation designed by taking into consideration the above described factors. More particularly, an elongated inclined trough 34 is installed beneath the lower end of the casing 10 and the receptacle 9 is formed like a funnel with its lower end 18b faced to a conveyor 11 so that certain amount of the sand particles with adjusted water quantity accumulates in the lower portion of the receptacle 9 so as to substantially seal the same. A discharge pipe 34a is provided between the lower end of the trough 34 and a funnel shaped water receiver 36 contained in a drain water tank 35 for accumulating the separated water in the water receiver 36. An inclined centepede endless conveyor 33 with pick up pieces 33a is provided to discharge solid components accumulated in the bottom portion of the receiver 36. Also a discharge pipe 32 having a suction port 23 is provided to discharge the water in the water tank 35 by a suitable pump, not shown, for using the water to prepare cement mortar or concrete. A water feed pipe 25 having a level detector 24 is provided for the water tank 35 so as to maintain the level of the water contained therein always at a constant level. If desired, the water feed pipe 25 may be opened in the trough 34 to clean the same or opened near the discharge end of a conveyor 30 utilized to load sand particles into the hopper 1 for adding water to the sand particles.

Although the purpose of the water separator of this invention is to adjust the quantity of the water deposited on the sand particles, that is the surface water, when the sand is substantially dry, i.e. contains only a small quantity of water, it is necessary to add water to the sand contained in the hopper 1. As above described, in some cases, the sand contains mud or clay which tends to adhere to the surface of the annular ring 6 especially when the water content of the sand is low, so that addition of water is effective. Thus, the added water removes the mud or clay deposited on the annular ring.

Where the tendency of depositing mud or clay on the inner surface of the annular ring 6 is large a scraper 28 is mounted on the lower end of a shaft 27 rotated by a motor 4a at a relatively low speed, for example less than 10 rpm. A layer of mud deposited on the annular ring 6 acts as a cushion layer so that the effect of adjusting the quantity of water by using an impact force would be impaired. Moreover, the adhesive layer of the deposited mud arrests the sand particles. Where such adhesive mud layer is removed by the scraper 28, the efficiency of adjusting the water quantity can be improved.

A screw 29 may be mounted on the vertical shaft 27 to constantly feed the sand onto the rotating disc 2 from the hopper 1. Variation in the quantity of the sand supplied to the rotating disc 2 prevents uniform adjustment of the water content.

Figure 6:
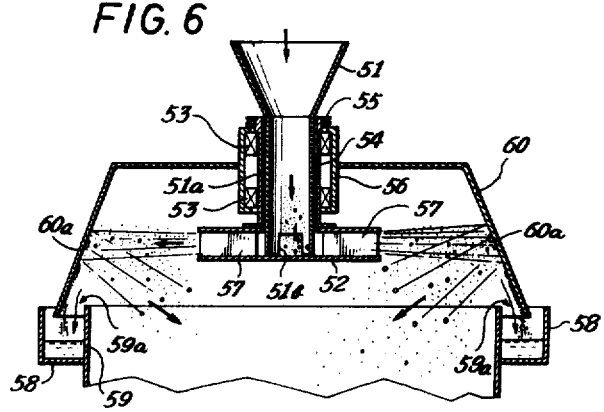
FIG. 6 is a longitudinal sectional view showing the upper portion of a modified water separator.

Details of modified water separator are shown in FIGS. 6 to 9. As shown in FIG. 6, a vertical supply pipe 51a connected to the bottom of a hopper 51 is directed to the central portion of a rotating disc 52 and at the lower end of the supply pipe 51a are formed discharge openings 51b on the opposite sides. As shown in FIG. 8, the rotating disc 52 is provided with a plurality of radial vanes 57 for distributing and projecting sand particles supplied through the discharge openings 51b. As shown in FIGS. 7 and 9, the rotating disc 52 is contained in an inverted dish shaped rectangular impact frame 60 so that the projected sand particles collide against the inner surface 60a of the impact frame 60. The lower end thereof surrounds the upper end of a receptacle 59 with gaps 59a (FIG. 6) therebetween, and water receiving troughs 58 are mounted near the upper ends of the shorter sides of the receptacle to receive separated water through gaps 59a. A bushing 54 adapted to support the rotating disc 52 is rotatably supported by a supporting cylinder 56 at the upper center of the impact frame 60 through bearings 53, and pulley 55 is secured to the upper end of the bushing 54 for rotating the rotating disc at a predetermined speed by an electric motor, not shown.

The modified embodiment shown in FIGS. 6 through 9 operates as follows:

Thus, the sand particles supplied from the hopper 51 are discharged on the rotating disc 52 in the specified direction, i.e. about the middle of the longer sides of the impact frame 60 in case of the example shown in FIGS. 8 and 9 and the sand particles projected by the rotating disc 52 are directed mainly to the shorter sides of the impact frame 60. A portion of the sand particles is projected upon the longer sides but will be guided to the shorter sides by an angle between the projection and the longer sides. In other words, substantially all portions of the projected sand particles would collide upon the shorter sides where excessive water is removed by the impact force, whereby sand particles with adjusted quantity of water would be collected in the receptacle. The separated water flows down along the shorter side of the inner surface 60a of the impact frame 60 and then received by troughs 58. Mud or clay contained in the original sand is also collected in the troughs 58. With this modification, as substantially all projected sand particles are caused to collide upon the shorter sides, the efficiency of water quantity adjustment can be improved.

Figure 11:
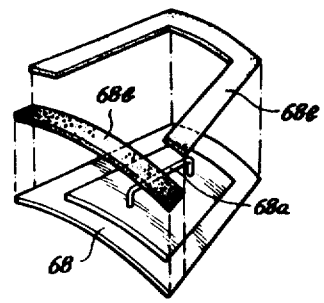
FIG. 11 is a perspective view showing a manner of attaching a section of an impact surface.
Figure 12:
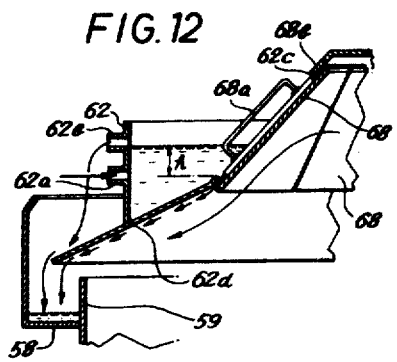
FIG. 12 is an enlarged sectional view showing the relationship between the impact surface, a cleaning water tank, a water receiving tank and a receptacle.

Still another modification of the water separator and various modifications of its parts are shown in FIGS. 10 through 15. In the modification shown in FIGS. 10 to 12 an impact frame 60b takes the form of an inverted frustum of a cone and is constructed such that its impact surfaces can be exchanged. The sand particles from a hopper 51 are caused to collide upon the inner surface of the impact frame to remove excess water. Since the sand particles are abrasive the inner surface of the impact frame 60b wears rapidly. Accordingly, an impact plate 68 is divided into a plurality of sections and each section is secured to the impact frame through a packing 68b by a fastener 68c as shown in FIGS. 10 and 12. To exchange a section it is inclined by a handle 68a and then pulled out of the impact frame 60b through an opening 60c. About the lower skirt 60d a portion of the impact frame 60b is provided with an annular water tank 62. Cleaning water is supplied into the water tank 62 through an inlet port 62a to a level higher than the upper edge of the skirt 60d by h. A small amount of the cleaning water continuously flows along the inner surface of the skirt 60d to prevent stagnation of mud. The water overflows through a discharge port 62b into a water receiving trough 58. Also the water flows along the inner surface of the skirt 62d toward the water receiving trough 58.

Figure 14:
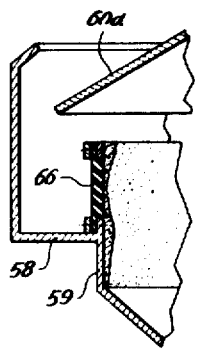
FIGS. 14 and 15 show modified means for removing the deposited sand particles which are simpler than that shown in FIG. 13.
Figure 15:
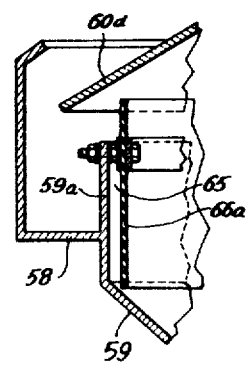

When the water separator is used in the field, the sand particles tend to adhere to the inner surface of the receptacle 59. To prevent this tendency, a vibrator 61 is installed in the receptacle 59. The sand particles adhere especially to the upper portion of the receptacle so that means for removing the deposited sand particles are provided for the upper portion as shown in FIGS. 13, 14 and 15.

Figure 13:
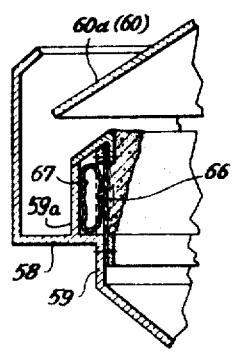
FIG. 13 is a partial sectional view showing means for removing deposited sand particles.

In an example shown in FIG. 13, an air bag 67 is interposed between the side wall 59a of the receptacle 59 and a hard rubber ring 66. By periodically varying the air pressure in the air bag 67 the sand particles deposited on the inner surface of the hard rubber ring 66 can be readily removed. In the example shown in FIG. 14, only the hard rubber ring 66 is secured to the upper edge of receptacle 59. Even with this simple construction, the hard rubber ring 66 is caused to vibrate by the sand particles blasted thereon, thus peeling off the deposited sand particles. In the example shown in FIG. 15 a hard rubber ring 66a is secured to the upper portion 59a of the receptacle 59 with a suitable air gap 65 therebetween. With the construction shown in FIG. 15, the hard rubber ring 66a can vibrate more freely to more efficiently remove the deposited sand particles.

In the water separator described above since the mud deposited on the skirt 60d and the sand particles deposited on the upper portion of the receptacle increases their volume with time, these deposited substances prevent smooth flow of water or sand particles; therefore, it will be clearly noted that use of the means for removing deposited substances is advantageous. When a rotating disc provided with vanes is used, air flow is created along the wall surfaces which is more or less effective to prevent deposition, but where the sand particles deposit, it will prevent smooth flow of air and grows rapidly.

Figure 16:
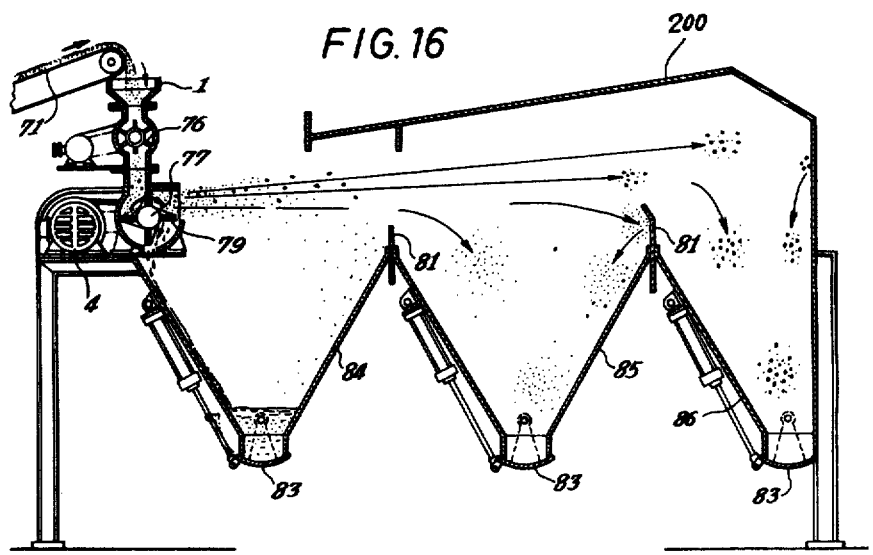
FIG. 16 is a sectional view showing another embodiment of the water separator not utilizing a rotating disc.

FIG. 16 shows another example of the water separator which removes excessive water by an impact force without utilizing the centrifugal force created by the rotating disc. In this modification, a fine aggregate, i.e. sand, is loaded into a hopper 1 by a conveyor 71 and then supplied to a horizontal rotor 77 provided with a plurality of radial vanes 79 by a metering device 76 which sequentially supplies the sand of a definite quantity. The rotor 77 is rotated by an electric motor 4 to apply a definite impact force to the sand particle received by the rotor. In front of the rotor 77 are disposed first to third hoppers 84, 85 and 86 to receive sand particles projected in the foreward direction by the rotor 77. Each hopper is provided with a discharge damper 83 for discharging sand particles collected in the hopper.

More particularly, the first hopper 84 is used to receive water and mud deposited on the sand particles, whereas the second and third hoppers 85 and 86 are used to receive sand particles with their surface water which has been adjusted. The hopper 86 collects coarser sand particles. Generally speaking, the sand particles impacted by the rotor are projected over different distances depending upon the mass of the sand particles. Water content adheres to the vanes and is gathered at the tip of the vanes 79 by centrifugal force and then discharged into the hopper 84 in the form of drops. A cover 200 is provided to cover hoppers 84, 85 and 86 which are partitioned by adjustable partition plates 81.

As above described, with the water separator shown in FIG. 16, excess water is removed by an impact force while the sand particles are classified according to their particle size. Since the quantity of water remaining on the treated sand particles differs depending upon the particle size, this modified water separator is especially suitable for a fine aggregate containing particles of different size because the sand particles are classified according to their size. Accordingly, the sand particles collected in each of the hoppers 85 and 86 have substantially the same particle size and the quantity of water remaining on the sand particles is also substantially constant.

Figure 17:
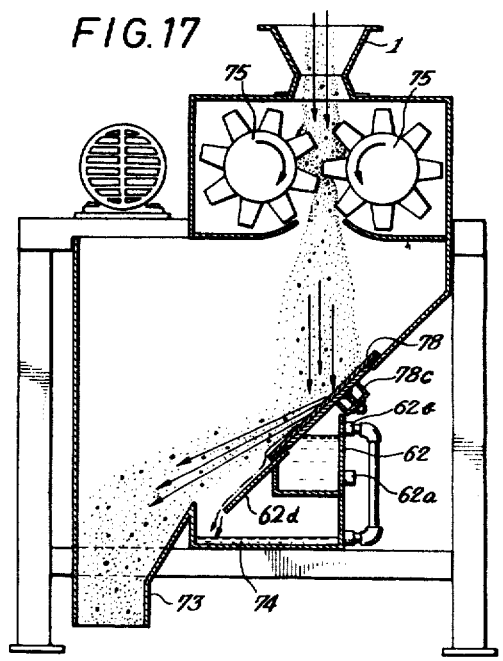

Still additional embodiments of the water separator are illustrated in FIGS. 17 and 18. In FIG. 17, the fine aggregate, i.e., sand is caused to drop between a pair of parallel spaced apart hard rubber rotors 75 which are rotated at a speed higher than the falling speed of the sand and is then discharged downwardly to impinge upon an inclined impact plate 78 secured by a fastener 78c. Then, the water deposited on the surface of the sand particles is separated and the sand particles are reflected toward the left as shown by solid arrows to be taken out through a discharge port 73. The separated water and mud are collected in a trough 74. Cleaning water is supplied and discharged from a storage tank 62 through inlet and outlet ports 62a and 62b in the same manner as in the embodiment shown in FIG. 12 to wash away mud accumulated on the rear side of the skirt 62d. Troph 87 is provided to collect the separated water. The sand particles may be projected in the horizontal direction or slightly downwardly in the same manner as in FIGS. 6 to 15. Furthermore, two or more pairs of the rotors 75 may be juxtaposed to increase the quantity of the sand to be treated.

In still another modification shown in FIG. 18A, the sand particles dropping from the hopper are projected at a high speed against an inclined impact plate 78 secured by a fastener 78e by means of a pair of conveyors 72 and 72a running at a high speed, and cleaning water is supplied to a skirt 62d at a lower position than the impact plate 78 to prevent mud from adhering to the inner surface of the skirt. By the high speed belt conveyors 72 and 72a a large velocity energy is applied to the sand particles regardless of the quantity thereof.

Where it is not desired to run the belt conveyors at a high speed, the upper belt conveyor 72a is replaced by a rotating member 80 (FIG. 18B) situated at the discharge end of the lower belt conveyor so as to impart the required velocity energy. Where the belt conveyors are run at a high speed, the sand particles tend to jump and splash thereby decreasing the efficiency of imparting the velocity energy. With the construction shown in FIG. 18B it is possible to efficiently remove water without dropping the sand particles away from the conveyor. Where it is not desirable to project the sand particles in the horizontal direction against gravity, the sand particles may be projected downwardly in the same manner as in FIG. 17.

In a modification shown in FIG. 19, the sand particles from the hopper 1 are supplied to a high pressure air nozzle 98 via a metering device 97 to eject the particles against the impact plate 78 by the velocity energy of the high pressure air, thereby removing excess surface water. As before, the inner surface of the skirt is cleaned by the cleaning water.

Figure 20:
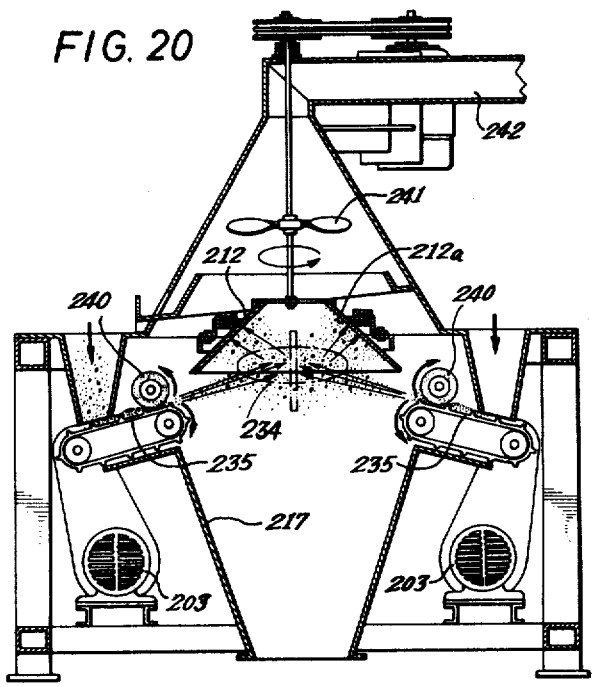

According to the embodiments described above since substantially all sand particles imparted with a high velocity energy are caused to collide upon the impact plate, the impact plate wears quickly so that it is necessary to frequently exchange the same. The modification shown in FIG. 20 is constructed to obviate this problem which comprises a pair of spaced belt conveyors 235 and rotating members 240 driven by motors 203 adapted to impart high velocity energy to the sand particles so that sand particles projected by the belt conveyors collide with each other in a space between the conveyors thus sprinkling the water removed from the sand particles in the space. A motor driven blower 241 is used to exhaust air entraining the sprinkled water to the outside through a duct 242 which may contain a mist separator not shown. With this construction, although all projected sand particles do not collide with each other, only a small amount of the projected sand particles collide upon an inverted funnel shaped impact plate 212 and 212a so that the wear thereof is small.

With the embodiment shown in FIG. 20 the impact force is different for respective sand particles so that the quantity of the water remaining on the sand particles is not always constant. To eliminate this problem, an impact plate 234 shown by dot and dash lines may be positioned between the belt conveyors 235. Where sand particles containing mud are projected, the impact plate 94 is taken out through a window, not shown, and cleaned. The impact plate 94 may be a thick casting.

In any of the embodiments described above, substantially uniform impact force is imparted to the fine aggregate so as to remove excess water. So long as the impact force is larger than the adhering force of the water to the particles of the fine aggregate it is possible to remove surplus water. The removed water flows down along the impact plate while the particles of the fine aggregate are permitted to fall down or move outwardly.

Figure 21:
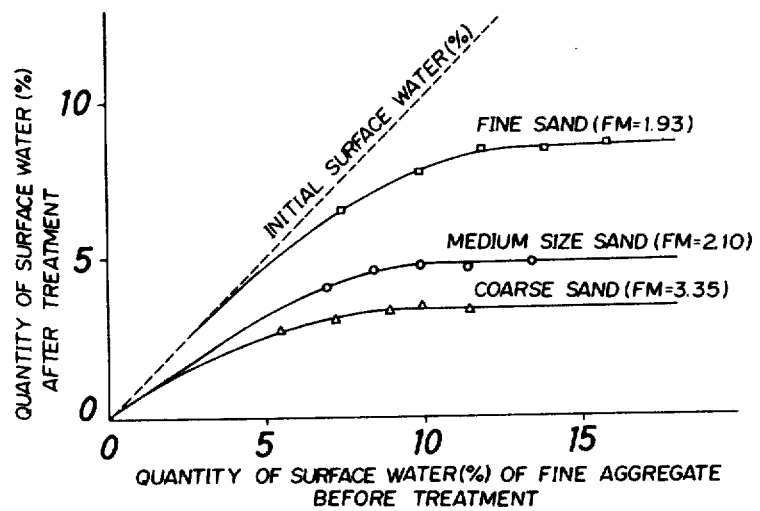
FIG. 21 is a graph showing the result of water removal.

The result of water separation effected by the water separator according to this invention is shown in FIG. 21. As can be noted from the curves shown in FIG. 21, irrespective of the difference in the quantity of the surface water which differs dependent upon the particle size, so long as the quantity of the surface water exceeds a predetermined limit before treatment, substantially constant quantity of water remains on the sand particles after the treatment. Even when the quantity of the initial water is less than the predetermined limit, a quantity of water proportional to the initial water quantity can be removed. When the impulse force is increased by increasing the speed of the rotating disc the quantity of the water remaining after the treatment decreases and vice versa, but the shape of the resulting curves resembles to that shown in FIG. 21. For this reason, in order to make uniform the quantity of water remaining after the treatment, a quantity of water is added to the fine aggregate to adjust its initial water quantity to be higher than 15%, for example.

In the embodiment shown in FIG. 1, water is added to the mixer B in two stages to be admixed with the fine aggregate treated by the water remover A.

More particularly, at the first stage water is added to the treated fine aggregate with a water sprinkler $D_1$ and the aggregate is thoroughly mixed together to apply uniform quantity of water on respective particles. Then, a powder of hydraulic substance, e.g. cement is added by an adder C and admixed with the fine aggregate to form shells of cement about the particles of the fine aggregate. An additional quantity of water is added by a water adder $D_2$ and the mixture is then kneaded. The shells thus formed are stable enough withstand to the subsequent addition of water and kneading. Accordingly, the structure molded with this mixture has a large mechanical strength. After incorporation of the hydraulic substance the mixture can be conveyed to a remote station.

It should be understood that according to this invention it is not always necessary to add water in two stages and to add the hydraulic substances between the additions of water. Thus, water may be added at one time. The fine aggregate with its quantity of surface water adjusted to a predetermined value by impact force determines the quantity of water to be subsequently added to prepare a kneaded compound, thereby reasonably determining the water to cement ratio W/C, the ratio of sand to cement S/C and other factors of compounding to cause uniform particles and to increase the mechanical strength of the products. Although coarse aggregate may be added at any stage it is advantageous to add it immediately prior to the addition of the primary water.

A preferred example of the mixer is illustrated in FIG. 22, which comprises a mixing chamber 110 containing a screw mechanism 104. As shown in FIG. 23, the mixing chamber 110 has a U-shaped cross-sectional configuration lined with a resilient film 105. Pressure applying chambers 106 are provided on the outside of the resilient film 105 to urge inwardly the resilient film 105. Fine aggregate which has had its surface water adjusted and coarse aggregate are fed into the mixing chamber 110 at its left-hand end from hoppers 101 and 103 respectively by a belt conveyor 111. A predetermined quantity of water is then added from a water tank 114 through a pipe 115 including a valve 115v. Secondary water is admitted into an intermediate section of the mixing chamber 110 from water tank 114 via a branch pipe 116 including a valve 116v. One or more additives such as a dispersing agent, a delay agent, a quick setting agent, etc., are supplied to the branch pipe 116 from a tank 117 through a pipe 118 including a valve 118v. Where it is not desirable to simultaneously incorporate a plurality of types of additives, a plurality of independent tanks each containing an additive of one type may be installed. At the rear or righthand end is formed an exhaust port 109 to discharge kneaded compound into a receiver 120. The compound in the receiver is conveyed to a working station by a tank car, a pipe, a conveyor or the like.

The pressure applying chamber 106 is sealed and is supplied with pressurized air or water. When pulsating pressurized fluid is applied it is easy to remove the compound adhered to the resilient film 105. The pressure applying chambers 106 contain elastic tubes 108. The tubes 108 can be substituted by sponge rubber or a hair rock (a mixture of hairs of human or animals bonded by latex or an artificial resin binder and having a substantial elasticity). Although the pressure applying chamber 106 can be provided along the entire bottom length of the mixing chamber 110 it is advantageous to install a plurality of spaced apart pressure applying chambers 106 as shown in FIG. 22. This construction prevents the resilient film from excessively bulging into the mixing chamber to interfere with the operation of the screw mechanism 104.

Where the mixer shown in FIG. 22 is used to prepare such compounds as mortar or concrete a powder of cement is supplied to the mixing chamber 110 from a cement tank 102 through a metering device 112. An operation between sand hopper 101 and the cement tank 102 comprises a first step I, an operation between the cement tank 102 and the secondary water supply pipe 116 comprises a second step II and an operation between the pipe 116 and the discharge port 109 comprises a third step III. More particularly, to prepare mortar or cement, in the first step I a portion of water necessary to prepare the final compound is added to a mixture of sand and gravel through pipe 115 and the water content of the mixture is made to be uniform by the screw mechanism 104. Then, a measured quantity of cement is incorporated to the mixture to form stable shells of cement about respective sand particles in the second step II.

When preparing cement mortar, in the third step the secondary water is added through pipe 116 together with one or more desired additives. With the connection shown in FIG. 22, the additive is firstly admixed with a large quantity of the secondary water in pipe 116 so that even an additive having a high viscosity can be uniformly admixed.

Instead of using a single resilient tube 108 as shown in FIG. 23, a plurality of juxtaposed tubes 108 may be used as shown in FIG. 24. With this construction it is not necessary to construct the pressure applying chamber 106 to be sufficiently air tight. Furthermore, the tubes 108 which should be air tight would not be damaged by the friction caused by the screw mechanism 104. Where water is filled into the tubes 108, their internal pressure can readily be adjusted by merely changing the level of a water tank. For example, the water tank may be positioned at a position higher than that of the tubes 108 by 1.5 to 2 meters. It was found that this level of the water tank is sufficient to prepare satisfactory cement mortar or concrete.

As shown in FIG. 23 additional pressure applying chambers 126 each containing a resilient tube may be provided above the screw mechanism 104. The resilient tubes 128 not only assist the action of the resilient tube 108 at the bottom of the mixing chamber but also reinforce the U shaped resilient film 105, especially when it is more or less aged or elongated thus maintaining a desirable sealing relationship to the screw mechanism 104.

The discharge port 109 can be formed at one side of the mixing chamber 110 as shown in FIG. 22 because this construction can contain the compound throughout the entire length of the mixing chamber so that even when the compound has a considerably high fluidity the entire length of the mixing chamber can be efficiently utilized.

FIGS. 25 and 26 show modified mixers. Thus, while in FIG. 22, the mixing chamber 110 is made of a single integral member, in FIGS. 25 and 26 the mixing chamber 110 is made up of a plurality of sections. More particularly, in the example shown in FIG. 25, the mixing chamber 110 comprises a plurality of cascade connected sections 110a, 110b and 110c which are disposed at different levels. A sand tank 101, a water tank 121 and a first screw section 104a driven by a motor $M_1$ are provided for the first section 110a. A water content measuring device 122 is provided for the sand tank 101 to measure the water content of the sand treated by the water remover A described above (FIG. 1) so as to control the quantity of water supplied from the water tank 121. The second section 110b comprises a second section 104b of the screw mechanism and a hopper 110e adapted to receive the mixture of sand and water from the first section 110a and a measured quantity of cement from the cement tank 102 via paddle wheel 112. The third section 110c is provided with a hopper 110d adapted to receive kneaded mixture from the second section 110b and secondary water from a water tank 123, and a discharge port 109 at the end of the third section and connected to a discharge pipe 124 for conveying the resulting compound to a receiver 120.

The section 104b of the screw mechanism is secured to a hollow tube comprising the second section, the hollow tube being rotated by a motor $M_2$ through a pinion and a ring gear 134 secured to the tube. A horizontal shaft 135 extends through the third section 110c and is driven by a motor $M_3$. The horizontal shaft 135 is provided with a plurality of paddles 136 which are set at a predetermined angle to assure uniform mixing.

In the modification shown in FIG. 26, the sections 110a, 110b and 110c are arranged coaxially to form a continuous mixing chamber. Sections 104a, 104b and 104c are mounted on a common shaft 140 driven by a motor $M_4$ located at the lefthand end of the mixing chamber. The second and third sections 110b and 110c are rotated by motors $M_2$ and $M_3$ respectively in a direction opposite to that of the screw sections 104b and 104c for the purpose of improving the mixing efficiency. For the purpose of adding the secondary water at the same position as that shown in FIG. 25 the shaft 140, at least in the third section is made hollow to feed water from a water tank 133 through perforations 133a at one end of the third section 110c.

Although the multiple section construction of the mixing chamber shown in FIGS. 25 and 26 is more or less complicated, since the volume of the contents of respective sections vary by the ingredients added in respective sections it is possible to construct respective sections to contain contents of varying volume. Mixers of different types may be used as shown in respective sections.

Figure 27:
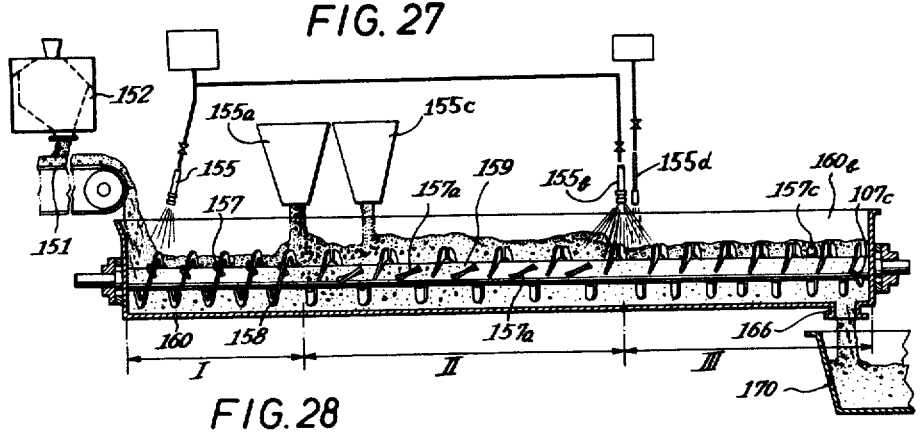
FIG. 27 is a longitudinal sectional view showing still another mixer.
Figure 28:
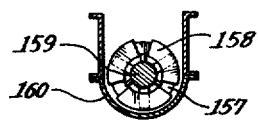
FIG. 28 is a cross-sectional view of the mixer shown in FIG. 27.
Figure 29:
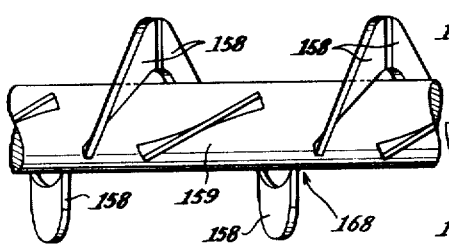
FIGS. 29 and 30 are perspective views showing the relative arrangement of the main and auxiliary mixing members.
Figure 30:
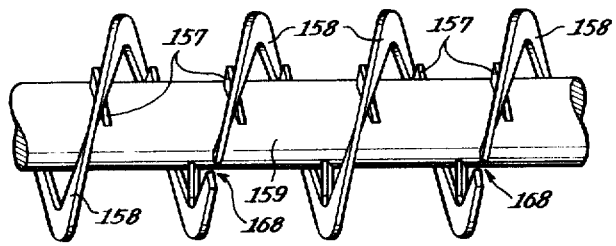

Another example of the mixer utilized in this invention is illustrated in FIGS. 27 and 28. As shown, a mixing chamber has a U shaped sectional configuration and a length sufficient to complete the entire mixing and kneading operations. A horizontal rotatable shaft 159 extends through the mixing chamber 160 and is provided with a plurality of mixing members 158 which are arranged generally along a helix. The angles of inclination and the pitches of the respective mixing members are varied in accordance with the mixing steps. Sand with its water content has been adjusted by the water separator A described above is supplied to the lefthand end of the first section I by a belt conveyor 151. The primary water is added at substantially the same position through a water pipe 155. Coarse aggregate, i.e. gravel, is added from a gravel tank 155a at a joint between the first and second sections I and II while cement is added from a cement tank 155c adjacent the gravel tank 155a. The secondary water and the additive are incorporated at a joint between the second and third sections II and III through pipe 155b and 155d respectively. In addition to the mixing members 158 relatively small auxiliary mixing members 157 are also mounted on the portions of the shaft 159 in the first and second sections I and II. These auxiliary mixing members 157 incline in a direction opposite to that of the main mixing members 158. If the direction of the auxiliary mixing members is the same as that of the main mixing members the angle of inclination of the auxiliary mixing members is made to be larger than that of the main mixing members. The main and auxiliary mixing members are inclined and are arranged along continuous helical lines respectively. As shown in FIGS. 29, 30, 33 and 34, the main mixing members are separated more than 30° about the periphery of the rotating shaft 159 and constructed such that each main mixing member does not extend over an angle of at least 360°. As shown in FIGS. 29 and 30 the auxiliary mixing members 157 has a smaller height than the main mixing members 158 and in the case shown in FIG. 30 the auxiliary mixing members 157 are utilized to support the main mixing members 158.

Figure 33:
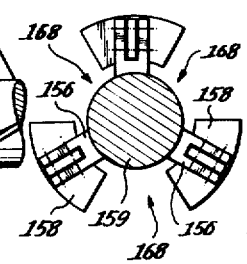
Figure 34:
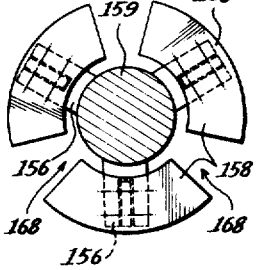

As shown in FIGS. 33 and 34, both main and auxiliary mixing members 158 and 157 are secured to the rotating shaft 159 by means of suitable fasteners 156.

In the construction shown in FIGS. 27 through 34 the speed of moving the mixture toward the discharge opening 166 varies depending upon the angle of inclination of the mixing members 157 and 158 with respect to the rotating shaft 159 corresponding to the variation in the bulk of the mixed composition charged. Considering only the weight, the speed of movement is the minimum at the charging end, while it is the maximum at the discharge end, but in the method of this invention where the water content of the mixture varies the problem is not so simple. Thus, the volume varies between a case wherein sand having a relatively small quantity of water, e.g. 2-3% and a case wherein sand contains much more water. In a relatively dry mixture incorporated with cement which forms shells, its volume shows a maximum, whereas when water is added to increase the fluidity of the mixture the weight thereof increases but its volume decreases greatly. In the step shown in FIG. 27 in which the primary water is added to make uniform the surface water, the angle of inclination of the main mixing members 157 is made to be a standard whereas the auxiliary mixing members 157 are inclined in the opposite direction to realize a relatively slow feed speed. In the second step II, the angle of inclination of the main mixing members 158 is made relatively large as shown in FIG. 29 whereas the angle of inclination of the auxiliary mixing members 157 is made larger so as to obtain higher feed speed thus allowing an increase in the bulk in step II. In the step III, after incorporation of the secondary water the fluidity increases thus further decreasing the volume. For this reason, in step III, the angle of inclination of the main mixing members 158 is made to be standard to decrease the feed speed than that of section II. For the reason described above, with a mixing chamber 160 having a uniform cross-sectional area the mixture can be mixed together with a constant surface level irrespective in the variation of the bulk. At the discharge port 166, the surface level of the mixture decreases rapidly as the mixture is discharged so that it is advantageous to provide an auxiliary mixing member 157a at this portion to make as long as possible the stay time of the mixture at this portion. The compound discharged through the port 166 is received by the receiver 170, but the discharged mixture can be conveyed by a conduit or a pump.

Figure 31:
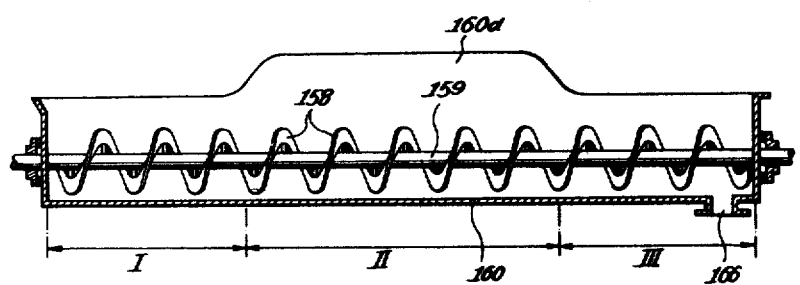
FIG. 31 is longitudinal view showing a modified mixing chamber.
Figure 32:
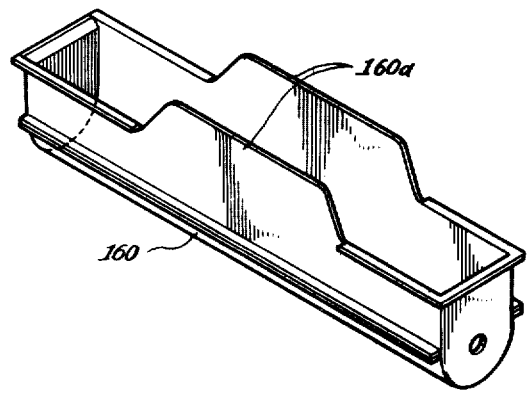
FIG. 32 is a perspective view showing the modified mixing chamber shown in FIG. 31, and FIGS. 33 and 34 are sectional views showing modified mixing members.

While in the embodiment shown in FIGS. 27–30, the variation in the bulk is coped with by varying the angle of inclination of the mixing members 158, in the embodiment shown in FIGS. 31 and 32, the variation in the bulk is coped by varying the volume of the mixing chamber 160. More particularly, the height of the side walls 160d of the mixing chamber 160 at section II is increased to increase the volume thereof. Because in the step in which shells of cement are formed about sand particles and the quantity of water between the sand particles is very small, even when the volume of the mixture increases, its fluidity is small so that the variation of the bulk can be coped with by merely increasing the height of the side walls 160d. Even when the high side walls 160d are provided, the cross-sectional configuration of the mixing chamber 160 is generally U shaped so that transfer of the mixture can be performed efficiently by the inclined mixing members 158, and the portion of the mixture bulged upwardly in section II is subjected to efficient mixing operation. When the pitch of the mixing member in section II is suitably selected, efficient mixing and kneading of the mixture can be assured with a relatively short length of the section II.

The embodiments shown in FIGS. 27–30 are suitable for preparing a large quantity of cement mortar or cement compound of excellent characteristic.

To have better understanding of the invention the following Examples are given.

EXAMPLE 1

In this example the apparatus shown in FIG. 2 was used which is provided with a rotating disc 2 having a diameter of 400 mm and driven by motor 4 at a speed of 1100 rpm. Fine river sand containing 3.98% of water and having a fineness modulus (F.M.) of 1.28 mm, said F.M. is determined according to the equation $$F.M. = \sum_{n=1}^{6} P_n/100,$$

where $P_n$ is weight percent of aggregate remaining in a mesh of 0.15, 0.3, 0.6, 1.2, 2.5 or 5.0 mm after meshing, the quantity of surface water varying from 4% to 25% was supplied to the rotating disc 2 to cause the sand particles to collide upon the impact plate 6. The rate of supply of the water containing sand to the hopper 1 was varied in a range of 50 to 160 Kg/min. and the water content of the sand conveyed by the conveyor 11 was measured to be 9.4–10.1% showing that the quantity of the surface water is substantially constant.

Where the speed of the rotating disc 2 was increased to 5000 rpm the quantity of the surface water was measured to be 6.06–6.38% which shows that the quantity of the surface water was substantially reduced than that when the rotating disc was rotated at a lower speed and the variation in the quantity of the surface water is much smaller.

EXAMPLE 2

With the same apparatus utilized in Example 1, sand particles of medium size and containing 2.25% of water and having F.M. of 2.28 mm was treated in the same manner. In this example, however, water was added to the sand at the exit of the hopper 1 at a rate of 4l/min. When the rotating disc 2 was rotated at a speed of 1100 rpm the water content of the treated sand was 4.7–5.3% showing that the quantity of the surface water has been decreased because the treated sand had a larger particle size. However, it was found that the range in which the quantity of the surface water varies has been narrowed. In contrast, when the speed of the rotating disc 2 was increased to 5,000 rpm the quantity of the surface water varied in a narrower range of 4.33 to 4.85%.

EXAMPLE 3

Coarse sand produced from a different origin from that utilized in Example 1 and having a water content of 3.31% and F.M. of 2.96 mm was treated in the same manner as in Example 2. More particularly, when the rotating disc 2 was rotated at a relatively low speed of 1100 rpm, the quantity of the surface water was 3.3–4.2% whereas at a higher rotating speed of 5000 rpm, the quantity of the surface water was 3.2 to 3.52% showing a narrower range.

EXAMPLE 4

In this example, the apparatus shown in FIGS. 4 and 5 was used in which the rotating disc 2 having a diameter of 450 mm was rotated by motor 4 at a speed of 1250 rpm. Medium size sand river having a water content of 2.25% and F.M. of 3.27% was caused to collide against the impact plate 6. Water containing sand was fed into the hopper 1 at a rate of 25 m$^3$/hour. 5–40 l/min. of water was sprinkled onto the sand while it is being conveyed by conveyor 30. The treated sand collected in the bottom portion of the receptacle 9 was conveyed by the conveyor 11. The conveyed sand was sampled at each minute to measure the water content of the treated sand. The water content measured was in a range of 8.79–8.93% and it was found that the quantity of the surface water was substantially constant, i.e. from 6.54 to 6.58%. The quantity of the recovered sand after the treatment was 24.1 m$^3$/hour, showing a high yield of 96.2%. Not recovered quantity consisted essentially of mud.

When the speed of the rotating disc 2 was increased to 1500 rpm the water content of the treated sand was 6.92–7.04% (the quantity of the surface water is 4.66–4.77%). At a higher speed of 1750 rpm, the water content of the treated sand was 5.79–5.88% (the quantity of the surface water was 3.53–3.62%). Thus, in each case the quantity of the surface water was reduced and is substantially constant. The quantity of the treated and recovered sand was 24.28 m$^3$/hour for 1500 rpm, and 24.52 m$^3$/hour for 1750 rpm.

EXAMPLE 5

The same apparatus utilized in Example 4 was used to treat medium size sea sand having a water content of 2.46%, a salt content of 0.33% and F.M. of 2.62%. In this example, 30 l/min. of water was added to the sand while it is being conveyed by the conveyor.

In this Example, when the rotating disc was rotated at a lower speed, the water content of the treated sand was 8.56–8.71% (the quantity of the surface water was 6.40–6.55%). Even with the same rotation speed of the disc, since the sand is coarse, its quantity of surface water has been decreased. Although the treated sand still contains 0.03% of salt, it can be used for preparing green mortar or green concrete because of the formation of the cement shells, and the quantity of the recovered sand was 23.8 m$^3$/hour.

When the rotating disc 2 was rotated at a speed of 1500 rpm the water content of the treated sand was 6.76–6.83% (the quantity of the surface water was 4.30–4.37%) whereas when the speed of the rotating disc was increased to 1750 rpm, the water content of the treated sand was 5.51–5.58% (the quantity of the surface water was 3.05–3.12, which shows that the variation in the water quantity is also small. The salt contents were 0.028% and 0.027% for 1500 rpm and 1750 rpm respectively and such salt containing sand could be used to prepare a concrete compound.

To remove salt it is necessary to use clean water of a quantity at least equal to that of sea sand so that to remove salt from 25 m$^3$ of sea sand it is necessary to use 25–80 m$^3$ of clean water. In contrast, according to this example the quantity of water added to the sea sand is only 30 l/min., or 1.8 m$^3$/hour.

When salt is removed by sprinkling water onto sea sand, the salt is not removed uniformly. For example, even through the average quantity of the remaining water is 0.03%, it varies between 0.002 and 0.150% meaning that a considerable quantity of washed water contained more than 0.04% of the remaining salt which is the permissible upper limit. According to this example, when water is added to the sea sand being conveyed by the conveyor at a rate of only 30 l/min., since the separation of water is efficiently performed by the impact force, the quantity of the remaining salt is only 0.007–0.038%.

EXAMPLE 6

Fine particles of a slag pulverized by water and having F.M. of 2.53 mm and containing 2.90% of water was treated in the same manner as in Example 4.

More particularly, when water is removed at the rotating speed of 1250 rpm of the disc 2, the water content of the slag particles was 8.99–9.27% (the quantity of the surface water was 6.09–6.37%) whereas at the speed of 1750 rpm, the water content was decreased to 6.19–6.28% (the quantity of the surface water was 4.29–4.38%) and the quantity recovered sand was 24.0 m$^3$, 24.3 m$^3$ and 24.51 m$^3$ at the speeds of 1250, 1500 and 1750 rpm respectively.

EXAMPLE 7

In this example, the apparatus shown in FIGS. 6–9 was used. Coal dust having a particle size of 0.15–5 mm and containing 3–15% of the surface water was treated by the apparatus. The feed speed was selected in a range of from 80 to 200 Kg/min.

The rotating member 52 was provided with vanes having a length of 250 mm between the axis and the outer end and the rotating member was rotated at a speed of 1500 rpm to remove water from the coal dust. After treatment, the coal dust contained 4.2–4.3% of the surface water showing uniform water removal. Mud on the particles of the coal dust was also efficiently separated.

EXAMPLE 8

In this example, the apparatus shown in FIGS. 10, 11 and 12 was used to remove water from blast furnace slag containing 20.5–57.5% of the surface water.

The rotating member 52 had a radius of 300 mm and rotated at a speed of 2000 rpm. The treated slag contained 12–15% of the surface water. The particle size of the slag was larger than 0.1 mm which can be classified.

EXAMPLE 9

The apparatus shown in FIGS. 6–9 was used, and in this example mineral particles having a oil content of 28–46% and a grain size of less than 3 mm was preheated to about 80° C. and then supplied to the hopper 1.

The rotating member 52 was provided with blades having a length of 250 mm between the axis and the ends of the blades. The rotating body was rotated at a speed of 1850 rpm, and the impact plate 60a was heated to about 60° C. After the treatment, the quantity of oil remaining on the mineral particles was 4.8–5.3% slowing substantially uniform removal of oil.

According to a prior art method of removing oil contained in mineral particles, the oil was removed by evaporation. To this end it has been necessary to heat the particles at a high temperature of 500° C. for a considerable period while agitating. Furthermore it is necessary to recover evaporated oil by condensation which requires an expensive equipment. In contrast, the apparatus of this invention is simple in construction, consumes less operating energy.

The following examples show use of the fine particles removed with water by the method and apparatus described above.

EXAMPLE 10

To prepare cement mortar according to a conventional method, nearly perfectly dried medium size river sand, water and 956 Kg of cement were used at a C/S ratio of 1:1 and at a W/C ratio of 35%. 765 Kg of a lignin sulphonic acid type dispersing agent was added and the mixture was kneaded. The resulting mixture evolved a considerable number of air bubbles and had a fluidity of 42 sec. when measured with a J funnel which have 6.5 cm in diameter of feed side, 45 cm in height and 1.0 cm in diameter of discharge side. The percentage of breezing after 3 hours was 6%. The product molded with this mortar had a compression strength of 375 Kg/cm$^2$, 489 Kg/cm$^2$ and 563 Kg/cm$^2$ respectively after 3, 7 and 28 days. The coefficient of variation after 28 days was 15.3%.

The same sand was dehydrated according to the process of Example 4 by using the apparatus shown in FIG. 4. When the rotating disc was rotated at a speed of 1750 rpm, the quantity of the surface water after the treatment was 3.53%. Cement, water (total water minus the remaining water and a dispersion agent were added to the treated sand in quantities to obtain the same W/S and W/C ratios described above. After kneading for two minutes, a cement mortar was obtained having a fluidity of 13 seconds when measured with a J funnel and the percentage of breezing of 0.5% after 3 hours. Products molded with this mortar had a compression strength of 532 Kg/cm$^2$, 698 Kg/cm$^2$ and 790 Kg/cm$^2$ respectively after 3, 7 and 28 days, the variation coefficient being 4.8%.

The water content of the same medium size sand was reduced at a rotating speed of 1750 rpm of the rotating disc to adjust the quantity of the surface water to 3.53%. After uniformly incorporating 16.47% of primary water to the sand thus treated a quantity of cement sufficient to obtain a ratio C/S=1:1 and the mixture was admixed to form cement shells having a W/C ratio of 20% about the sand particles. After adding 15% of the secondary water and 0.8% of a dispersing agent the mixture was kneaded to obtain cement mortar having a fluidity of 19 sec., and zero breezing percentage after 3 hours. The compression strength of the products molded with this mortar was 619 Kg/cm$^2$, 739 Kg/cm$^2$ and 855 Kg/cm$^2$ respectively after 3, 7 and 28 days, the variation coefficient being 2.2%. When compared with products prepared by the prior method, the products according to this invention has higher compression strength and is more stable.

EXAMPLE 11

The same quantity of the same sand as that of Example 10 but not dehydrated according to the method of this invention, 347 Kg of cement, 3.5 Kg of a dispersing agent and water were mixed together to obtain mortar having ratios C/S=1:2, C/G=1:3.6 and W/C=42% to prepare mortar having a slump value of 2.1 cm and appreciable breezing and air bubbles. The compressive strength of the products molded with this mortar was 208 Kg/cm$^2$, 284 Kg/cm$^2$ and 334 Kg/cm$^2$ respectively after 3, 7 and 28 days, the variation coefficient being 17.4%.

Similar mortar was prepared except that the surface water has been reduced to 3.53%. The mortar, less than 2.5 minutes after kneading, had a slump value of 8.2 cm and showed certain segregation and breezing. The products molded with this mortar had a compression strength of 274 Kg/cm$^2$, 348 Kg/cm$^2$ and 482 Kg/cm$^2$ after 3, 7 and 28 days respectively and a variation coefficient of 8.2% showing increase in the strength by 50% and uniform quality.

6.47% of the primary water was added to the same river said adjusted its quantity of the surface water to 3.53% and the same quantity as above described of sand was added to form cement shells whose W/C content was 20%. Thereafter gravel, 22% of the secondary water and 1% of a dispersing agent based on the quantity of cement were incorporated and kneaded together to obtain a concrete compound having a slump value of 11.6 cm. The product molded with this concrete compound had a compression strength of 308 Kg/cm$^2$, 382 Kg/cm$^2$ and 513 Kg/cm$^2$ respectively after 3, 7 and 28 days and a variation coefficient of 5.1% showing an increase of 50% of the compression strength and uniformity of the products.

EXAMPLE 12

To a concrete compound having the same formulation as that of Example 11 was added with 1.5% by volume of steel fibers. In this example, the sand was not dehydrated according to the method of this invention. The resulting concrete compound had a slump value of 1.5 cm and showed large segregation and breezing. The bending strength of the concrete product molded with this concrete compound was 58 Kg/cm$^2$ after 28 days.

In contrast, similar concrete compound utilizing the same sand dehydrated by the method of this invention had a slump value of 7.4 cm immediately after the kneading and showed a slight segregation and breezing. But a concrete product molded with this concrete composition showed a bending stength of 75 Kg/cm$^2$ after 28 days.

A concrete compound utilizing dehydrated sand particles formed with cement shells having a ratio of W/C of about 20% and incorporated with the steel fibers had a slump value of 12.8 cm, and showed no breezing. The concrete product molded with this concrete compound had a bending strength of 92 Kg/cm$^2$ after 28 days.

EXAMPLE 13

The same river sand as that used in Examples 10-12 was used. 350 Kg of cement, 1120 Kg of sand, 700 Kg of a coarse aggregate, and 10.5 Kg of a quick setting agent were admixed under dry state. The resulting mixture was conveyed by high pressure air to a working station where water was added in an amount to obtain a W/C ratio of 50%. The resulting concrete compound was blasted against a vertical wall through a blasting nozzle. The quantity of rebound was 35%. When blasted against the wall of a tunnel, the quantity of dust generated was about 750 CPM. 28 days after blasting the concrete had a compression strength of 232 Kg/cm$^2$ and a variation coefficient of 14.5%.

The concrete compound having the same composition as in Examples 10-12 except that the quantity of the surface water was adjusted to be 3.53% was prepared and the concrete compound was blasted under the same conditions, and it was found that the quantity of rebound was 18% and the quantity of dust generated was 340 CPM. The blasted concrete had a compression strength of 363 Kg/cm$^2$ after 28 days and a variation coefficient of 5.3%.

The same sand adjusted its surface water to be 3.53% and a quantity of cement were mixed together to form cement shells having a W/C ratio of 20%. Then a quantity of water to ensure a ratio W/C=34.2% and 0.6% based on the weight of cement, of a dispersing agent were added to prepare a mortar having a high fluidity. The mortar was conveyed under pressure through a pipe. Another dry compound was prepared having ratios C/S=1:3.01 and S/A (A represent a coarse aggregate) of 56% and conveyed under pressure through another pipe. The two compounds were admixed at the working station at a ratio of 1:1.75 by volume together with a suitable quantity of a quick setting agent. The concrete composition suitable for blasting had a ratio W/C of 42% and contained 352 Kg of cement, and blasted against a wall. The amount of rebound at the time of blasting was 8.9% the quantity of dust generated was 72 CPM. The compression strength of the blasted concrete after 28 days was 542 Kg/cm$^2$ and the variation coefficient was 3.2%. The compression strength was increased by 100% and the variation coefficient was reduced to 1/5 when compared with conventional concrete compound.

EXAMPLE 14

In this example the water remover A shown in FIG. 16 was combined with the mixer B shown in FIG. 27. A medium size river sand (containing 23% of water and a quantity of surface water of 3-27%) and having F.M. of 2.1 was treated by the water remover A.

The rotating member 77 was provided with vanes 79 having a length of 225 mm and rotated at a speed of 1250 rpm. The water containing sand was supplied to the hopper 1 at a rate of 50–120 Kg/min. The sand in the hopper 85 contained 6.7–6.9% of the surface water, and that in the hopper 86 contained 6.4–6.8% of the surface water. The quantity of the surface water of the sand contained in the hopper 86 corresponds to that of the medium size sand.

Where the speed of the rotating member was increased to 1500 rpm, the water content of the sand in the hopper 85 was 5.6–5.9%, that of the sand in the hopper 86 was 5.2–5.4%. When the speed is increased further to 1750 rpm the water content of the sand in the hopper 85 was 3.9–4.2% and that of the said in the hopper 86 was 4.1–4.3% showing substantially equal water content.

Cement, water and 1% of a dispersing agent, based on the volume of cement were added to the sand thus treated to obtain ratios of C/S—1:2 and W/C=43%. The quantity of water added corresponds to the difference between the added water and the surface water. The kneaded mixture had such fluidity that the shearing strength $F_o$ of 1.54 g/cm$^2$, a relative viscosity coefficient $\lambda$ of 0.86 g/sec. cm$^4$, a relative closure coefficient $\Delta F_o$ of 0.0034 g/cm$^4$ and a gregation and breezing of 0.05%. The compression strength of a molded product utilizing the mortar thus prepare had a compression strength of 438–452 Kg/cm$^2$ (average 447 Kg/cm$^2$) and 521–545 Kg/cm$^2$ (average 534 Kg/cm$^2$) after 7 and 28 days respectively. Although a little gregation and breezing were noted, the product had uniform strength.

In addition to the kneading operation in which all quantity of water is added at a time, another process was also performed which includes the shell forming step and water was added in two stages. More particularly, preliminary water was added through pipe 155 to ensure surface water of 10%, then a quantity of Portland cement was added to obtain a ratio W/C of 20%. Finally, 153 Kg of the secondary water ad 1% based on the volume of the cement of a dispersing agent were incorporated to prepare cement mortar having ratios S/C=2 and W/C=43%. The fluidity of the mortar was such that the initial shear strength $F_o$ of 2.63 g/cm$^3$, a relative viscosity coefficient $\lambda$ of 1.08 g.sec/cm$^4$ and a relative closing coefficient $\Delta F_o$ of 0.0072 g/cm$^4$. No segregation and breezing was noted. The molded product had a compression strength of 521–545 Kg/cm$^2$ (average 535 Kg/cm$^2$) and 628–656 Kg/cm$^2$ (average 642 Kg/cm$^2$) after 7 and 28 days respectively.

A portion of piled up sand, 285 Kg of water, 664 Kg of cement were admixed and kneaded to obtain a mortar having $F_o$ of 0.74 g/cm$^3$, $\lambda$ of 1.37 g.sec/cm$^4$, $\Delta F_o$ of 0.014 g/cm$^4$, and a segregation and breezing of 1.4%. The product molded with this mortar had a compression strength of 268–367 Kg/cm$^2$ (average 332 Kg/cm$^2$) and 353–501 Kg/cm$^2$ (average 397 Kg/cm$^2$) respectively after 7 and 28 days. Thus the mechanical strength is substantially lower and varies variously.

EXAMPLE 15

A mixer A shown in FIGS. 6 to 9 was used for dehydration. Fine water containing sand (the quantity of the surface water of 3 to 27%, percentage of water absorption of 2.8%, and F.M. of 1.93) was supplied to the upper portion of the hopper 51 and water was sprinkled onto the sand at a rate of 30 l/min. while the sand is being conveyed. The rotating member 52 was rotated at a speed of 1500 rpm to project the sand at a rate of 360–450 Kg/min. The quantity of water remaining on the sand particles after the dehydration treatment was 8.3–8.5% showing a small variation. This means that even when the rotating speed is varied more or less, it is possible to adjust the quantity of the surface water as desired.

Cement gravel and water were added to the dehydrated sand in such amounts to obtain ratios S/C=1:2, S/G=38.5% and W/C=43%. 1.2% based on the volume of the cement of a dispersing agent was added and then kneaded. The resulting concrete had an excellent fluidity and a slump value of 15.6 and only a slight segregation and breezing were noted. The product molded with this concrete compound had an average compression strength of 285 Kg/cm$^2$ and 412 Kg/cm$^2$ after 7 and 28 days respectively, the variation coefficient thereof being 8.8%.

Where the mixer shown in FIG. 27 was used, the primary water was added to the treated sand to adjust its surface water to be 10%, 1150 Kg of gravel and a powder of Portland cement were then added to adjust the ratio W/C to be 20%. Then 83 Kg of the secondary water and 1.2% based on the volume of the cement of a dispersing agent were added to obtain a concrete compound having ratios S/C=2, S/A=38.5, and W/C=43% and a high fluidity of 17.2 cm in terms of the slump value. The product molded with this concrete compound had an average compression strength of 351 Kg/cm$^2$ after 7 days and 468 Kg/cm$^2$ after 28 days showing only 5% variation coefficient.

As a control, the water content of the same sand was measured and corrected. Then, 360 Kg of cement, 155 Kg of water, 720 Kg of sand and 1150 Kg of gravel were admixed with a mixer to produce a concrete compound having the same formulation as above described, and a slump value of 12 cm. The average compression strength of a molded product was 197 Kg/cm$^2$ and 343 Kg/cm$^2$ after 7 and 28 days respectively. Thus, not only the variation coefficient is 15.6%, but also the strength is lower and varies.

EXAMPLE 16

The water separator shown in FIGS. 10 to 12 was used to treat a coarse river sand containing 3.8–26% of water (percentage of absorption of 1.7%) and coarseness of 3.35.

The rotating member 52 was rotated at a speed of 1750 rpm to adjust the surface water to 3.2–3.3% of the sand supplied from the hopper 51 at a rate of 360 to 450 Kg/min. After incorporating the primary water to the treated sand to adjust its surface water to 14%, a powder of Portland cement was added to produce a W/C ratio of 20%. Thereafter, 290 Kg of the secondary water and 1.2% based on the volume of the cement of a dispersing agent were added and kneaded to obtain a mortar having ratios S/C=1.5, W/C=38% and such fluidity that the initial shear strength $F_o$ of 0.69 g/cm$^2$, a relative viscosity coefficient $\lambda$ of 0.35 g.sec/cm$^4$, and a relative closing coefficient $\Delta F_o$ of 0.0032 g/cm$^4$. The mortar was transported by a pump to a station 120 m apart through a pipe having an inner diameter of 5 cm at a speed of 67 m/min. At the station 1 part of sand, the surface water thereof had been adjusted to 3.2–3.3%, 0.95 part of gravel having a size of 1–15 mm and a powder of cement were incorporated to form cement shells in which W/C is about 18% at a point 5 m before a blasting nozzle. The concrete compound was then blasted against the inner wall of a funnel.

The quantity of the blasted concrete composition was about 8 m$^3$ per hour, the ratio W/C thereof was 33.4% and the quantity of cement was 509 Kg/m$^3$. The amount of rebound at the time of blasting was 6.5% and the quantity of dust generated was 1.21 mg/m$^3$. The round upper wall of the funnel was satisfactory blasted to a thickness of 120 mm without any peeling. The average compression strength of the blasted concrete was 329 Kg/cm$^2$ and 603 Kg/cm$^2$ after 3 and 8 days respectively. The variation coefficient was 3.2% and the average strength was higher by 1.4 times of the prior art concrete having the same formulation, while the variation coefficient was reduced to 1/5.

Where the quantity of the surface water of all portions of the sand was not adjusted but only a sampled portion was adjusted and when concrete was prepared by admixing the sand and then blasted according to the prior art wet or dry process. The amount of dust generated at the time of wet blasting was 6–10 m/m$^3$ whereas that of the dry blasting was 6–10 mg/m$^3$. The quantity of dust, i.e. 1.21 mg/m$^3$ of this invention is much lower than these values. While with conventional concrete the amount of rebound is 20–30% in both wet and dry blasting according to this invention the amount of rebound was reduced to a fraction of these amounts. Moreover, the reaction applied to the nozzle is much smaller than blasting prior art concrete compound. The conveyed quantity of 3–4 m$^3$/hour of the prior art concrete could be doubled when a pipe line having an inner diameter of 5 cm was used.

EXAMPLE 17

In this example the water separator shown in FIG. 10 was used to treat a river sand containing 3–15% of the surface water (percentage of water absorption 2.3% and coarseness of 2.1). In this example, water was added to the sand at a rate of 32 l/min. while the sand is being conveyed by the conveyor. The rotating member 52 was rotated at a speed of 1780 rpm and the sand was supplied thereto at a rate of 360–450 Kg/min. The quantity of the surface water remaining on the sand particles was 4.6–4.7% showing uniform water removal.

After adding the primary water to the treated sand such that its surface water would be 7.6%. Then 1196 Kg of gravel and a quantity of Portland cement were added such that the ratio W/C would be 18%. The resulting mixture was transported by trucks to a working station spaced by 2 hour distance. 92.4 Kg of the secondary water and 1.2% based on the volume of the cement of a dispersing agent were incorporated into the mixture at the working station to prepare a concrete compound having ratios of W/C=2.34, S/A=38.5% and W/C=46.8%. The concrete had a high fluidity as evidenced by its slump value of 12.5 cm and no segregation and breezing was noted. The product molded with the concrete compound had an average compression strength of 303 Kg/cm$^2$ and 420 Kg/cm$^2$ after 7 and 28 days respectively and a variation coefficient of 4.3%.

On the other hand, a green concrete having the same formulation but prepared according to the prior art method decreases its slump value in proportion to the time required for transportion thus degrading workability. For this reason, it is necessary to agitate the green concrete during transportion. In addition, after transporting over a long distance it has been necessary to further add water at the working station which decreases the mechanical strength of the product. For example, the compression strength after 28 days of the product prepared with such green concrete was only 300 Kg/cm$^2$ and its variation coefficient was about 15% which should be compared with 4.3% of this invention. In addition, according to this invention it is not necessary to transport the total quantity of the water.

EXAMPLE 18

In this example, the mixer shown in FIG. 22 was used having an inner diameter of 350 mm of the mixing chamber 110 and a total length of 40 m. The shaft or screw 190 was rotated at a speed of 70 rpm. River sand with its surface water adjusted to 3.8–4.2% by the water remover shown in FIGS. 4 and 5 was supplied to the mixing chamber from the hopper 101 at a rate of 232 Kg/min. and gravel was supplied from the hopper 103 at a rate of 412 kg/min. Then water was supplied through pipe 115 at a rate of 11.25 l/min. to adjust the surface water of the aggregates to 11.6–12.6%. Then cement was added to the aggregate from tank 102 at a rate of 115 Kg/min. to form cement shells whose W/C ratio was adjusted to be about 24%. To the mixture were added the secondary water and a mixture of lignin and sulphonic acid through pipe 116 at rates of 18.6 l/min. and 1.13 l/min. respectively followed by continuous kneading to form a green concrete at a rate of 20 m$^3$/hour in which W/C=42%, C/S=1:2 and S/G=1:1.78.

This green concrete had a slump value of 12 cm and showed no segregation and breezing. The product molded with this green concrete had a compression strength of 254 Kg/cm$^2$, 345 Kg/cm$^2$ and 442 Kg/cm$^2$ respectively after 3, 7 and 28 days.

EXAMPLE 19

The mixer shown in FIG. 25 was used. Thus, an artificial light weight fine aggregate (specific gravity 1.4) containing 8% of surface water, and the other artificial light weight coarse aggregate (specific gravity 1.6) having a particle size of about 15 mm and containing about 1% of the surface water were prepared. The fine aggregate was charged into the hopper 101 at a rate of 159 Kg/min., while the coarse aggregate was charged into the hopper 101 at the same rate. Water was sprinkled upon the aggregates from tank 121 at a rate of 11 l/min. to adjust the surface water of the aggregates to 15%.

A powder of cement was added to the mixture of the fine and coarse aggregates from hopper 102 at a rate of 117 Kg/min. to form cement shells about the aggregates. Then water and naphthalene sulphonate type water decreasing agent were incorporated from tank 123 at the rates of 31 l/min. and 6 l/min. respectively.

The resultant concrete had an excellent fluidity as evidenced by it slump value of 15 cm, and no segregation and bleeding was noted. The composition of the green concrete comprised 350 Kg of cement, 480 Kg of sand, 162 l of water and 18 l of water decreasing water, each per cubic meter. Its W/C ratio was 46%, and the percentage of the coarse aggregate was 50%. The producted molded with this green concrete had a compression strength of 216 Kg/cm$^2$ and 386 Kg/cm$^2$ respectively after 7 and 28 days. The product prepared by the prior art method had a compression strength of 173 Kg/cm$^2$ and 331 Kg/cm$^2$ after 7 and 28 days respectively.

EXAMPLE 20

In this example, the mixer shown in FIG. 26 was used. More particularly, sand having a particle size of less than 5 mm and containing 6% of the surface water and gravel having a grain size of 25 mm and containing 1% of the surface water were prepared and charged into hopper 101 at rates of 260 Kg/min. and 348 Kg/min. respectively. Water was supplied to the tank 101 from tank 121 at a rate of 8 l/min. to adjust the surface water of the aggregates. Then cement was added to the mixture of the sand and gravel from hopper 102 at a rate of 117 Kg/min. to form cement shells about the aggregates.

A mixture of water (at a rate of 31 l/min.) and lignin sulphonate type water decreasing agent (at a rate of 6 l/min.) was supplied to the mixing chamber from hopper 133. The green concrete discharged into the receiver 120 had a slump value of 17 cm and no segregation and breezing was noted, showing high fluidity. The composition of the green concrete was: 350 Kg of cement, 780 Kg of sand, 1043 Kg of gravel, 162 l of water, 18 l of the water decreasing agent, each per cubic meter and its W/C ratio was 46%.

The product molded with this green concrete had a compression strength of 224 Kg/cm$^2$ and 403 Kg/cm$^2$ after 7 and 28 days respectively. The concrete products prepared by the prior art method had a compression strength of 183 Kg/cm$^2$ and 348 Kg/cm$^2$ respectively after 7 and 28 days respectively which prooves excellent property of the product of this invention.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of preparing a cement compound comprising the steps of adding a quantity of water to sand particles to increase their water content, sequentially supplying a predetermined quantity of said sand particles to which water has been added, applying to said sand particles an impact force, stronger than the adhesive force of the water to said sand particles, to remove excess water and mixing cement with said sand particles.

2. A method of preparing a hydraulic compound comprising the steps of applying an impact force to a fine aggregate to remove excess water deposited on particles of said fine aggregate, adding a portion of water necessary to prepare said hydraulic compound, adding a hydraulic substance to the resulting mixture of fine aggregate and water to form shells of said hydraulic substance about the particles of said fine aggregate, adding the remaining portion of said water necessary to prepare said hydraulic compound, and kneading the resulting mixture.

3. The method according to claim 2 wherein an additive is incorporated together with said remaining portion of said water.

4. The method according to claim 2 wherein the quantity of portion of said water is determined according to the quantity of water remaining on the particles of said fine aggregate.

5. The method according to claim 2 wherein either one or both of a coarse aggregate and fibrous substance is added to said fine aggregate.

6. The method according to claim 2 wherein said fine aggregate which has had excess water removed therefrom and other ingredients of the hydraulic compound are conveyed to a working station by independent conveying means and then mixed together and blasted at said working station.

7. A method of preparing a hydraulic compound comprising the steps of supplying a predetermined quantity of particles of fine aggregate having water on the surface thereof, applying to said particles an impact force stronger than the adhesive force of the water to said particles thereby adjusting the quantity of water remaining on the surface of said particles to a predetermined value, adding to said particles a quantity of water and hydraulic substance and then kneading the resulting mixture.

8. The method according to claim 7 wherein water is applied to said particles before the application of said impact force so that said particles contain water in an amount larger than a quantity of water remaining on said particles after the application of said impact force.

* * * * *